United States Patent [19]
McCarthy et al.

[11] Patent Number: 5,241,782
[45] Date of Patent: Sep. 7, 1993

[54] WIRE-FORM CROP COVER SUPPORT

[75] Inventors: E. Dennis McCarthy, Snyder; Ronald W. Weekley, Hamburg, both of N.Y.

[73] Assignee: Better Wire Products, Inc., Buffalo, N.Y.

[21] Appl. No.: 748,012

[22] Filed: Aug. 21, 1991

[51] Int. Cl.$^5$ .............................................. A01G 13/02
[52] U.S. Cl. ............................................ 47/29; 47/26; 47/28.1; 47/47
[58] Field of Search ................. 47/26, 28.1, 29, 31, 47/17, 47

[56] References Cited

U.S. PATENT DOCUMENTS

| | | | |
|---|---|---|---|
| 409,133 | 8/1889 | Yarborough | 47/26 |
| 947,519 | 1/1910 | McAdie | 47/26 |
| 1,106,624 | 8/1914 | Cadwallader et al. | 47/26 |
| 1,987,255 | 1/1935 | Husted | 47/26 |
| 2,155,992 | 4/1939 | Menachof | 47/26 |

FOREIGN PATENT DOCUMENTS 1008907  5/1952  France ................................. 47/26

*Primary Examiner*—Carl D. Friedman
*Assistant Examiner*—Wynn Wood
*Attorney, Agent, or Firm*—John C. Thompson

[57] ABSTRACT

A support used for supporting a crop cover such as plastic sheet, cloth or netting that is often applied over crops in a field having a plurality of stakes which receive a plurality of the wire-form crop cover supports about their upper ends. The crop cover supports are either formed from a single typically galvanized wire or are formed from two or more galvanized wires welded together. The wire-form crop cover supports include a lower portion having a series of wire loops which are adapted to be disposed about the upper end of a stake, an intermediate wire portion including an upwardly extending flexible wire segment, and a top wire portion having a wire end, the top wire portion being shaped in such a manner that the wire end will not damage the crop cover. The wire-form crop cover support further includes a stop segment which may rest on the top end of the stake. When the wire-form crop cover supports of this invention are mounted upon the associated stakes they will support the crop cover in such a manner that a free floating "canopy" is provided well above the threatening stakes, which canopy may billow in the wind to break up frost stratifications.

16 Claims, 3 Drawing Sheets

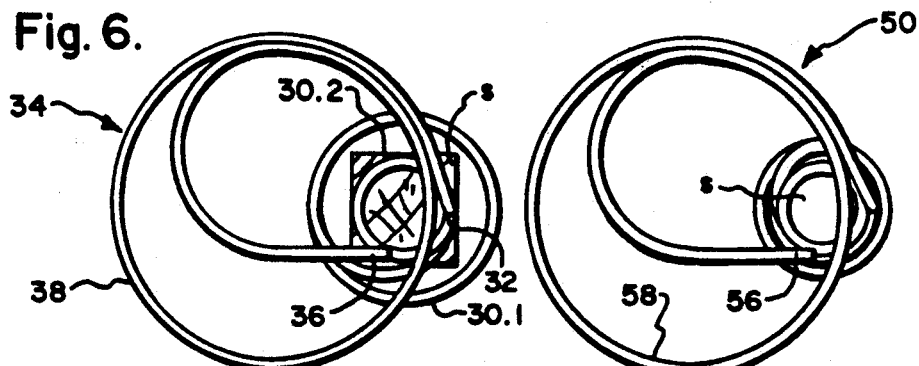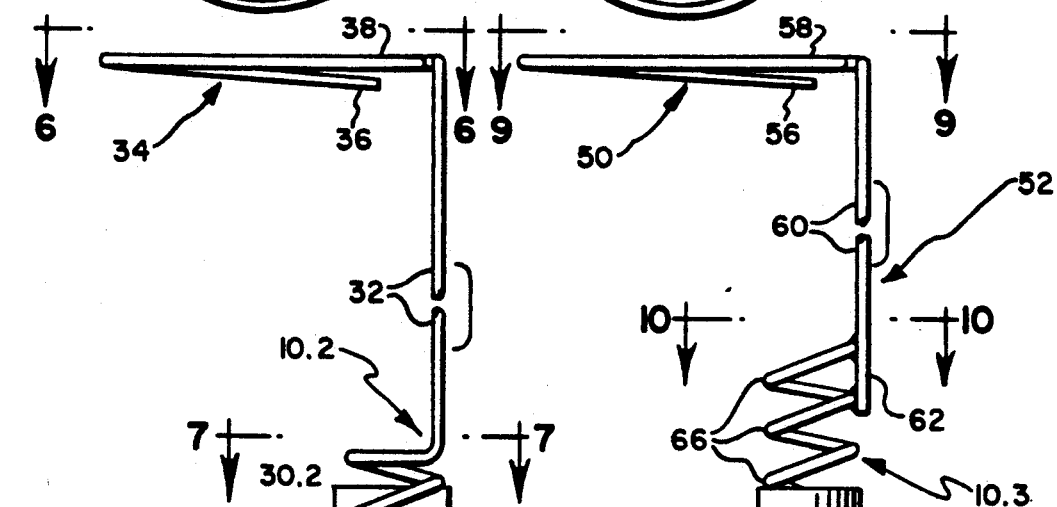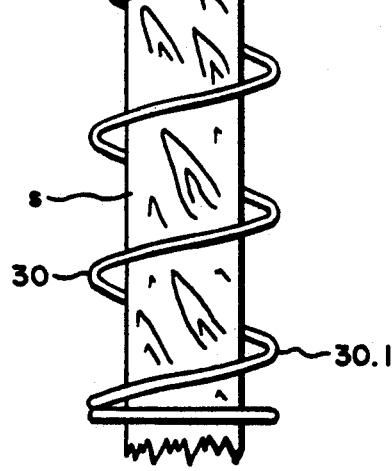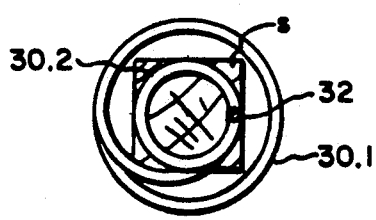

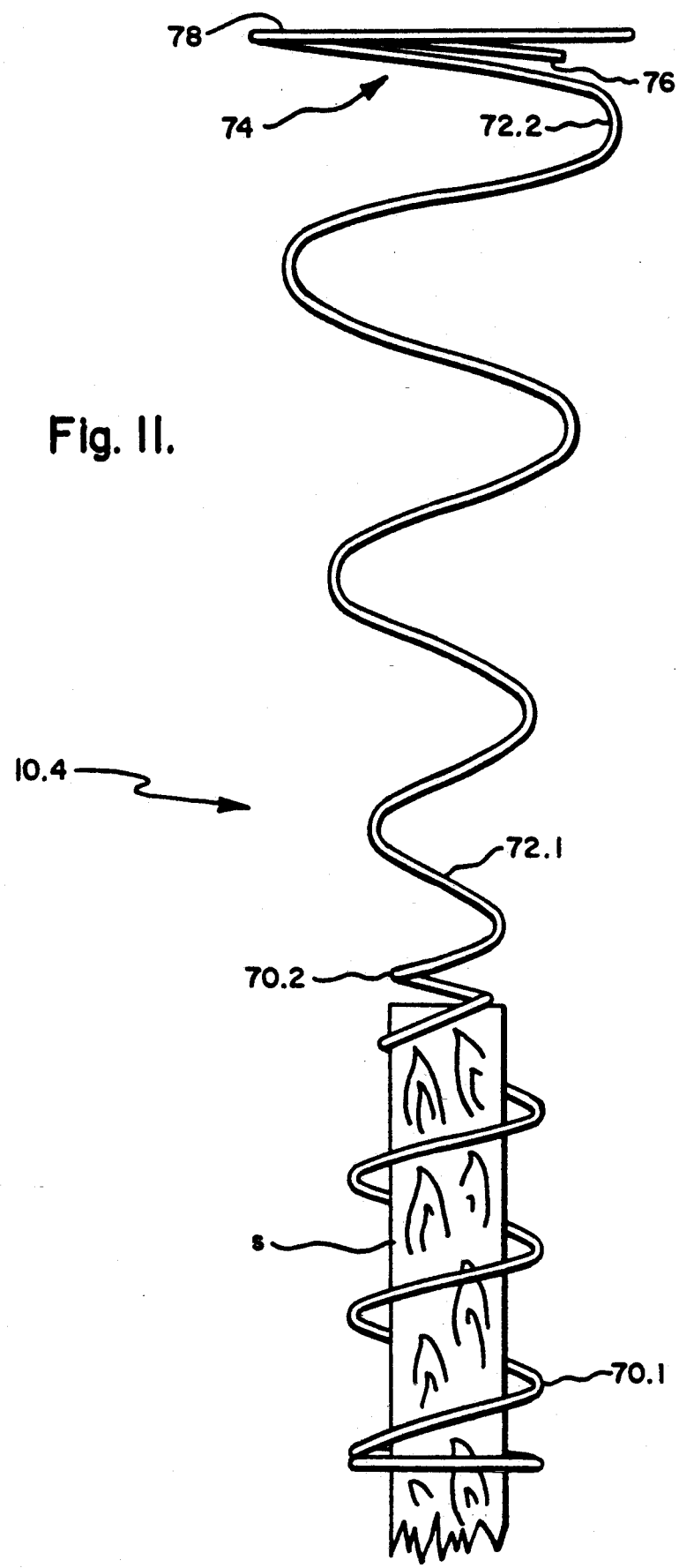

WIRE-FORM CROP COVER SUPPORT

Technical Field

The present invention relates generally to supports, and more particularly to a support made of a formed wire or wires, which support may be used for supporting a crop cover such as plastic sheet, cloth, or netting that is often applied over crops in a field, there being a plurality of stakes in the field which receive a plurality of the wire-form crop cover supports about their upper ends.

Background of the invention

In various agricultural regions it is common practice to cover growing crops with a crop cover such as a plastic sheet, cloth or netting at certain times. A typical example of such a use is when growing staked vegetables, such as cherry tomatoes, pole tomatoes, and peppers. In Florida, Texas and Southern California it may be necessary to cover the crops at the time of a frost warning to prevent the crops from being damaged during the frost. When a frost warning occurs, the crop cover will be unrolled and supported by the stakes in the field, the perimeter edges of the crop cover being held down by earth which is shoveled onto the edge of the crop cover for this purpose. Typically a frost warning occurs when a weather front moves in, and the front is typically accompanied by winds. As the typical frost cover used today is relatively fragile, and since the upper ends of the stakes are frequently rough or have sharp corners, the crop cover may be damaged during installation, while in place as the front moves through, or afterwards during removal of the crop cover.

Because of the damage which may occur to the crop cover various solutions have been tried. These efforts include thumb-tacking plastic lids from cylindrical food containers onto the tops of stakes. Inverted styrofoam cups have also been tacked to stake tops. Also styrofoam half-spheres with molded cavities in the underside have been forced down over stake tops. Other items tried include plastic elbows and "T"s used in plumbing, slit tennis balls and long wire wickets.

Each of the above efforts at a solution to insure the reusability of often expensive covers have faced drawbacks in actual use. Plastic and styrofoam items often possess granular or seamed edges that catch on fragile cloth crop covers, as does the rough nap of a tennis ball. Tacked down items often dislodge when buffeted by windblown crop covers. Stationary wire wickets create wear points in the crop covers ultimately causing holes or tears at those wear points, as is typical of all devices that are rigidly assembled to the stake tops.

All devices which are tacked down require a relatively labor intensive installation. The removal of such devices frequently causes damage to the protective device preventing its reuse. Also, devices which become dislodged after initial installation require further additional labor during replacement.

Styrofoam half-spheres or "caps" have proven to give the most problems. When jammed on irregular or oversized stakes they often crack, break or expand beyond any future reuse. They frequently blow off the stakes after installation and require resetting. The caps are pushed off the stakes by high plant growth, and have been known to lift off the stakes by electrostatic friction with the crop cover. Also, the blown away and broken caps are not biodegradable. In addition, styrofoam decomposes when attacked by certain farm sprays.

The ultimate purpose of the above-mentioned devices was intended to protect and preserve the growers major investment in often expensive covers during periodic use in a given season and for years thereafter. Because of the shortcomings in the devices mentioned above this goal was seldom achieved.

Objects and Summary of the Invention

It is an object of the present invention to provide crop cover supports for freeze and shade cloth as well as plastic sheet, and netting, which supports can be mounted upon stakes, and which will not only overcome the disadvantages of prior known devices but also will create an economic gain by virtue of the following: (a) the present invention lends itself to preserving fragile crop covers over years of reuse; (b) the supports of this invention need not be installed on every stake in the field as required by all other known devices; (c) the supports of this invention can be reused over many seasons; and (d) it requires minimal labor during installation, use, and removal at the end of the season.

More particularly it is an object of the present invention to provide freeze, frost and shade crop cover supports which will not be easily dislodged from the tops of the stakes upon which they are mounted, which will not be affected by winds, rains, chemical sprays or accidental dislodgement during plant management and picking, which are easy to install, which can be used for a number of seasons, and which, due to its flexible design, will move with the wind blown motion of the crop cover, thereby preventing the creation of wear points and subsequent holes in the crop cover.

The above objects and other objects and advantages of this invention are accomplished by providing a wire-form support either formed from a single wire or formed from two or more wires welded together, the wire(s) typically being galvanized, the wire-form support including a lower portion having a series of wire loops which are adapted to be disposed about the upper end of a stake, an intermediate wire portion including an upwardly extending flexible wire segment, and a top wire portion having a wire end, the top wire portion being shaped in such a manner that the wire end will not damage the crop cover.

The foregoing will become more apparent after a consideration of the following detailed description taken in conjunction with the accompanying drawings in which the principles of this invention are illustrated.

Brief Description of the Drawings

FIG. 5 is side elevational view the preferred embodiment of this invention.

FIGS. 6 and 7 are views taken generally along the lines 6—6 and 7—7 in FIG. 5.

FIG. 8 is a side elevational view of a third embodiment of this invention.

FIGS. 9 and 10 are views taken generally along the lines 9—9 and 10—10 in FIG. 8

FIG. 11 is a side elevational view of a fourth embodiment.

Detailed Description

Figure 1:
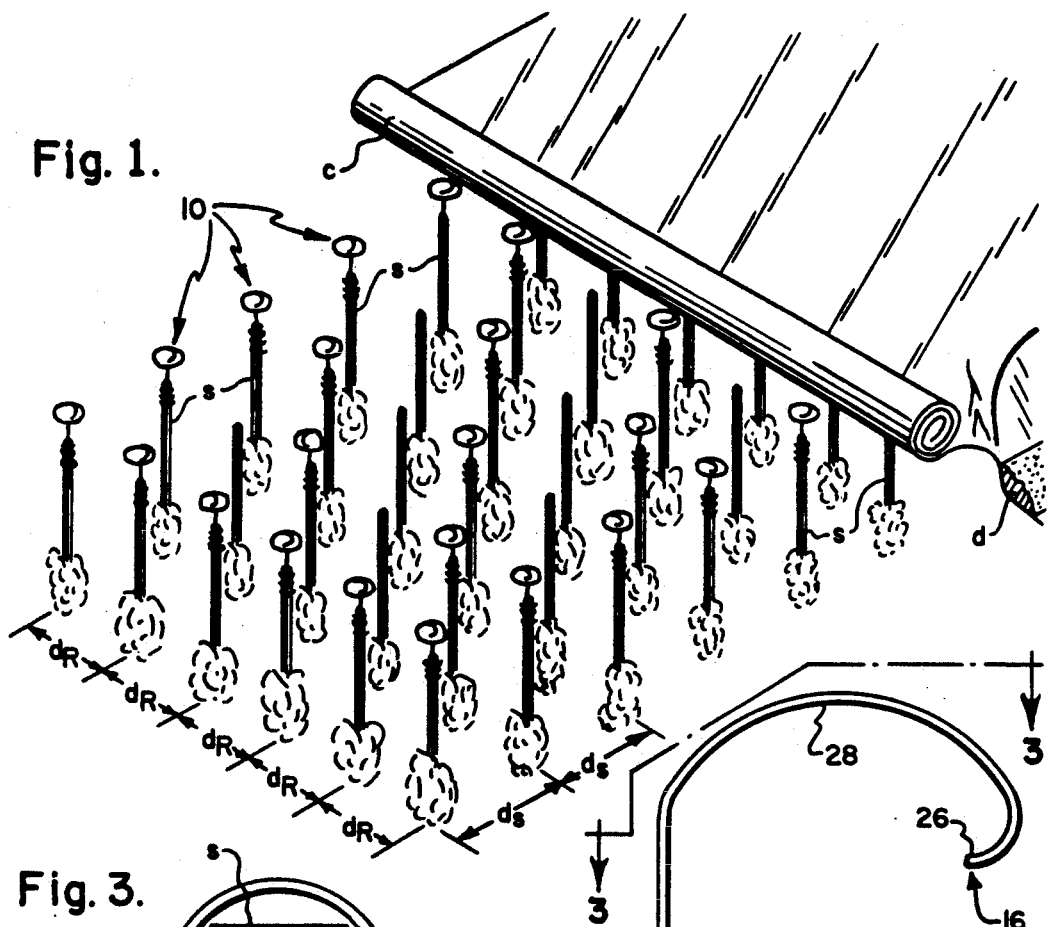
FIG. 1 illustrates a portion of a field having staked crops, for example tomatoes and peppers, to which a frost or shade crop cover is shown being applied, the perimeter stakes and every second stake within the perimeter carrying a wire-form support of this invention.

FIG. 1 illustrates how this invention may be applied to a field growing tomatoes and peppers. In such a field a single block which is suitable for coverage by a crop cover, such as a frost cloth, may measure 34 feet wide by hundreds of feet long, the block having hundreds of stakes s. The distance $d_R$ between the rows in this field will typically be six feet whereas the distance $d_S$ between the stakes s in each row will typically range from 24 to 48 inches. However, it should be appreciated that the distances $d_R$ between the rows and the distance $d_S$ between the stakes within each row may vary. The type of field illustrated permits a worker to go up and down the field between every adjacent row. In some situations two rows may be planted closely together, say one foot apart from each other, in which case there will be an additional wide row spacing between every other row to permit the worker to go up and down the field in which case you may have a $d_{R\text{-}1}$ spacing of twelve inches and a $d_{R\text{-}2}$ spacing of five feet.

The crop cover which is to be disposed over the stakes s is indicated by the letter c. As the crop cover is being applied there will be enough crop cover extending to either side of the stakes in the block that it may be brought down to ground level, the sides being held in place by dirt d shoveled onto the edge of the crop cover. In addition, the crop cover will be long enough so that the ends of the crop cover, when fully applied to the block of stakes, may also be held down by dirt in the same manner as the sides.

Figure 2:
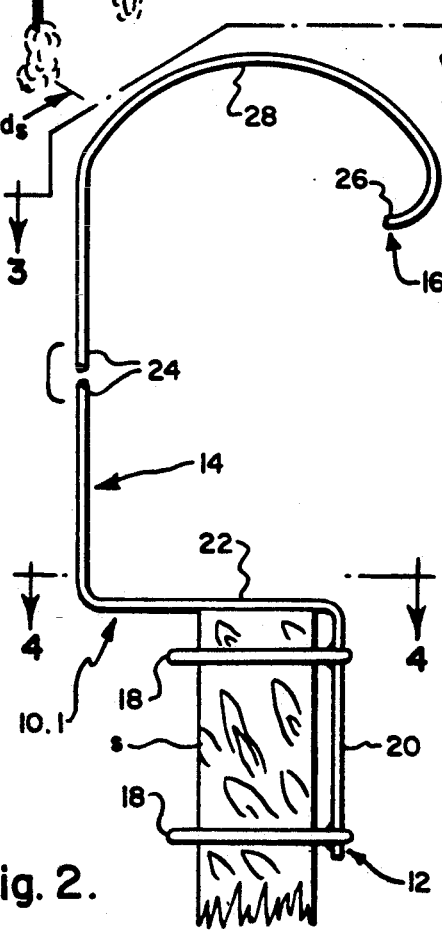
FIG. 2 is a side elevational view of a first embodiment of this invention.

In accordance with the principles of this invention the crop cover c will be supported by novel wire-form supports indicated generally at 10 in FIG. 1, the first embodiment of the wire-form support being indicated at 10.1 in FIG. 2, the second embodiment being indicated generally at 10.2 in FIG. 5, the third embodiment being indicated generally at 10.3 in FIG. 8, and the fourth embodiment being indicated generally at 10.4 in FIG. 11. In the following detailed description and claims the terms vertical, horizontal, upper, lower and other similar terms are with reference to the position of the parts when in their normal use position and should not be construed as limiting. Each of the wire-form supports is formed preferably from galvanized wire and includes a lower portion which is adapted to be disposed about the upper end of a stake, an intermediate portion which includes an upwardly extending flexible wire segment, and a top portion which is adapted to support the crop cover, the end of the wire at the top being disposed in such a manner that it will not damage the crop cover. These features will be described in greater detail in connection with each of the embodiments.

Figure 3:
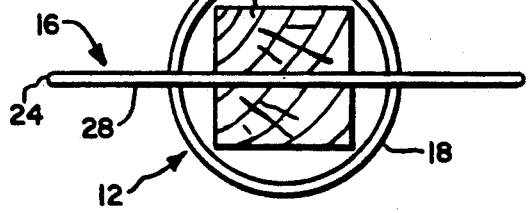
FIGS. 3 and 4 are views taken generally along the lines 3—3 and 4—4 in FIG. 2.
Figure 4:
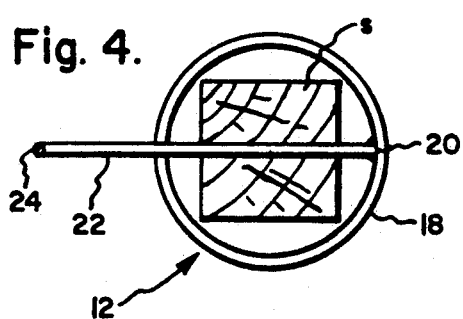

Reference will now be made to FIGS. 2-4 which illustrate a first embodiment of the present invention. In this embodiment the support includes a lower portion indicated generally at 12, an in intermediate portion indicated generally at 14, and an upper portion indicated generally at 16. The lower portion includes a series of wire loops in the form of spaced apart rings 18. In the illustrated embodiment the stake s is formed from wood having a one inch square cross section. However, other forms and sizes of wooden stakes may be utilized, such as a regionally popular stake having a one by two inch rectangular cross section. The rings 18 are so sized that their internal diameter is large enough to freely receive the upper end of the stake s.

The intermediate portion 14 includes a lower vertically extending segment 20, an intermediate transversely extending segment 22, and an upwardly extending flexible segment in the form of an essentially vertical straight wire 24. As can be seen the lower segment is welded to the spaced apart rings 18. The transversely extending segment 22, which acts as a stop, is adapted to rest upon the top end of the stake s. The vertical flexible wire segment 24 is long enough to accommodate lateral movement of the crop cover after installation, a typical length of the upwardly extending flexible wire segment being in the range of 6 to 10 inches.

The top wire portion has a wire end 26. In the embodiment illustrated in FIGS. 2-4 the top portion lies in a vertical plane and is arc shaped, and the end of the wire 26 is disposed below an intermediate segment 28 of the arc shaped portion.

The wire-form support illustrated in FIGS. 2-4 is utilized by placing it on all perimeter stakes and other selected stakes within the perimeter in the manner illustrated in FIG. 1. Typically the crop cover c will be used for frost protection and therefore it will be necessary to put the wire-form supports on the stakes before the earliest possible frost, and to leave them on the stakes until after the frost season is over, at which time they may be removed for future use. However, once they are installed, it is only necessary to unroll the crop cover in the manner illustrated in FIG. 1, the crop cover being disposed upon the top portions of the wire-form supports. As the end 26 of the wire is below the top segment of the arc 28 the crop cover will not be damaged during installation. In addition, as the vertical wire segment 24 is flexible the crop cover can move under proper conditions without significant rubbing against the top portion of the wire. At the conclusion of the frost season the wire-form supports may be removed. However, if the crop cover is being used for other purposes, for example shade or insect protection, the supports may be left on the stakes for the entire growing season. It should be appreciated that the wire-form crop cover support of this invention may be applied and removed with minimal labor requirements. In addition, the supports may be reused for a number of seasons, a feature not possible with some prior art devices.

While the design shown in FIGS. 2-4 is generally satisfactory, with some crop covers and under some circumstances it has been found that wear and subsequent holes can occur in the crop cover by having only a single line of support. In addition by having the intermediate segment of the wire 22 extend horizontally so that the full length of the intermediate segment rests directly upon the top of the stake in the manner shown it has been found that the top portion of the wire cannot move as much as would be desired under some circumstances.

A preferred design of this invention is shown in FIGS. 5-7. In this design each wire-form support 10.2 also includes lower, intermediate, and top wire portions. In the second embodiment the entire wire-form support is formed from a single piece of wire. The lower portion in the form illustrated is in the form of a helical coil 30 having a number of turns, the helical coil having a lower cylindrical segment 30.1 and an upper frusto-conical segment 30.2. When this is the case the upper end of the frusto-conical segment 30.2 is supported by the top end of the stake. Alternatively, the frusto-conical upper end portion 30.2 can be replaced by a transversely extending wire which extends across the midsection above the top end of the stake to provide a stop for the wire-form support so that it will not slide down the stake beyond the desired mounting location. When the wire extends transversely it will be at a slight angle to the horizontal, for example 15 degrees, so that there is only a single point of contact. In either case, the lower portion 30.1 of the helical coil has turns with an internal diameter sufficiently large to freely receive the upper end of the stake. The embodiment shown in FIGS. 5-7 further includes an intermediate wire portion including an upwardly extending flexible wire segment in the form of an essentially straight wire 32 which may also be in the neighborhood of six to ten inches long. The top wire portion of the preferred embodiment, which is indicated generally at 34, has a wire end 36. The top wire portion is shaped in such a manner that the wire end 36 will not damage the crop cover, and to this end the top wire portion has a horizontally disposed circular segment 38 which is adapted to contact the crop cover over a relatively wide area, for a circumference of approximately nine inches. Because of the relatively wide area of support and also because the intermediate portion is flexible, it has been found that this crop cover support can be used with virtually no damage to the crop cover when the crop cover is properly installed, even when the crop cover is subject to normal windy situations. The spacing between the coils or turns 30.1 at the top end of the stake is less than the diameter of the stake s. Therefore, the stake will not project through the crop cover support even if the wire 32 becomes severely flexed as the top 34 moves with the crop cover under windy conditions.

The wire-form supports described so far have been developed for use with wooden stakes. In some areas a preferred form of stake is a metal stake in the form of reinforcing bar, which is commonly called - rebar. In those areas, rebar typically has a ⅝ inch diameter. An alternate form of support has been developed for use with such rebars, this form of support being shown in FIGS. 8-10. This third embodiment can be made from one continuous wire as in FIG. 5, or, as illustrated, it can be made from two wires as in FIG. 2. When a two wire design is utilized the upper wire will form the top wire portion, indicated generally at 50, and also the intermediate wire portion, indicated generally at 52. A lower wire portion is also provided which is indicated generally at 54. The top wire portion is substantially identical to the top wire portion shown in the FIGS. 5-7 embodiment. Thus, the top wire portion has an end 56 and a horizontally disposed circular segment 58. The intermediate wire portion 52 includes an upper upwardly extending flexible wire segment 60 in the form of a straight wire and a lower vertically extending segment 62 which is secured to the lower wire portion 54 by welding. The lower wire portion also includes a series a wire loops formed by a helical coil. In this case the helical coil has a lower cylindrical segment 64 which has an internal diameter sufficiently large to receive the upper end of the rebar stake. In addition, the lower end portion 54 also includes an upper helically coiled wire segment 66 which has an internal diameter sufficiently small that it cannot receive the upper end of the stake, this segment providing appropriate support as can be see. The upper segment 66 is preferably formed of three coils or turns. The lower segment 62 of the intermediate wire portion 52 is secured to the top two coils 66 by welding. The purpose of the lower coil 66 is to provide additional flexibility to the system.

An alternate embodiment to that shown in FIG. 5 is shown in FIG. 11. This embodiment, which will be referred to as the fourth embodiment, also includes lower, intermediate and top wire portions. In the fourth embodiment the entire wire-form crop cover support 10.4 is formed from a single piece of wire. The lower portion in the form illustrated is, like in FIG. 5, formed from a helical coil 70, the helical coil having a lower cylindrical segment 70.1 and an upper frusto-conical segment 70.2. As can be seen the upper end of the frusto-conical segment 70.2 is supported by the top end of the stake s. In the fourth embodiment the intermediate portion includes an upwardly extending flexible wire segment in the form of a frusto-conical coil 72. The lower part 72.1 of the fructo-conical segment is of a diameter less than the upper part 72.2. In any event, the segment 72.1 and 72.2 act together to provide increased flexibility to the intermediate portion. The top portion, indicated generally at 74, is to a large extent similar to the top portions 34 and 50 of the second and third embodiments and thus it includes an end 76 disposed below the uppermost circular portion 78.

The advantage of the fourth embodiment over the two wire designs of the first and third embodiments is simply that it involves a one piece construction. In addition, this design has an advantage over the designs shown in the second and third embodiments illustrated in FIGS. 5 and 8 in that no secondary operations are required as there are no substantially right angle bends as in the second and third embodiments between the intermediate and top portions. Thus, this design can be made entirely in one operation on a spring wire machine. It should be noted that the number and pitch of the coil segment 72 has yet to be optimized.

It will be understood that the foregoing description and illustrations are by way of example only and that such changes and modifications as may suggest themselves to those skilled in the art are intended to fall within the scope of the present invention as defined by the appended claims.

What is claimed is:

1. A wire-form crop cover support for supporting a crop cover which is used to cover crops in a field, there being a plurality of stakes having upper ends in the field which receive a plurality of the wire-form supports about said upper ends; each wire-form support comprising:

a lower wire portion including a series of wire loops adapted to be disposed about the upper end of a stake;

an intermediate wire portion including an upwardly extending flexible segment; and a top wire portion having a wire end, the top wire portion being shaped in such a manner that the wire end will not damage the crop cover.

2. The wire-form crop cover support as set forth in claim 1 wherein the series of loops are a helical coil.

3. The wire-form crop cover support as set forth in claim 2 wherein the helical coil is cylindrical, and wherein the intermediate wire portion has a lower transversely extending segment which extends inwardly from the uppermost turn of the helical coil, thereby providing a stop which may rest on the top end of the stake.

4. The wire-form crop cover support as set forth in claim 2 wherein the helical coil is frusto-conical, the upper end segment of the frusto-conical helical coil being supported by the top end of the stake.

5. The wire-form crop cover support as set forth in claim 2 wherein the helical coil has lower and upper segments, the lower segment having an internal diameter sufficiently large to receive the upper end of a stake, and the upper segment having an internal diameter sufficiently small so that it cannot receive the upper end of the stake, the stake supporting the lowermost turn of the upper segment.

6. The wire-form crop cover support as set forth in claim 5 wherein the upper segment of the helical coil has three turns, a lower end of the intermediate wire portion being welded to the upper two turns, the lowermost turn of the upper segment providing increased flexibility to the intermediate wire portion.

7. The wire-form crop cover support as set forth in claim 1 wherein the series of loops are a plurality of vertically spaced apart rings each having an internal diameter sufficiently large so that it may receive the upper end of a stake, the intermediate wire portion having a lower wire segment which is welded to the vertically spaced apart rings.

8. The wire-form crop cover support as set forth in claim 7 wherein the intermediate wire portion is provided with a generally transversely disposed intermediate segment which may be supported by the upper end of a stake, the upwardly extending flexible segment extending upwardly from the intermediate segment.

9. The wire-form crop cover support as set forth in claim 1 wherein the upwardly extending flexible segment is an essentially straight vertical wire.

10. The wire-form crop cover support as set forth in claim 1 wherein the upwardly extending flexible segment is a frusto-conical coil, the top part having a greater diameter than the bottom part.

11. The wire-form crop cover support as set forth in claim 10 wherein the series of loops are a helical coil, the helical coil having lower and upper segments, the lower segment having an internal diameter sufficiently large to receive the upper end of a stake, and the upper segment having an internal diameter sufficiently small so that it cannot receive the upper end of the stake, the stake supporting the lowermost turn of the upper segment.

12. The wire-form crop cover support as set forth in claim 1 wherein the top wire portion lies in a vertically extending plane, the top wire portion being formed in an arc shape, the end of the wire end of the top wire portion being below an intermediate segment of the arc.

13. The wire-form crop cover support as set forth in claim 1 wherein the top wire portion has a horizontally disposed circular segment, the end of the wire end of the top wire portion lying below the circular segment.

14. A wire-form crop cover support for supporting a crop cover which is used to cover crops in a field, there being a plurality of stakes having upper ends in the field which receive a plurality of the wire-form crop cover supports about said upper ends; each wire-form crop cover support comprising:

a lower vertically extending cylindrical helical coil wire portion having a series of wire loops, the lower end segment of the coil having an internal diameter sufficiently large to receive the upper end of a stake;

an intermediate wire portion having a lower transversely extending segment which extends inwardly from the uppermost end of the helical wire portion, the intermediate wire portion further including an upper vertically extending flexible segment; and a top wire portion having a wire end, the top wire portion being shaped in such a manner that the wire end will not damage the crop cover, the top wire portion including a horizontally disposed circular segment, the wire end lying below the circular segment.

15. A wire-form crop cover support for supporting a crop cover which is used to cover crops in a field, there being a plurality of stakes having upper ends in the field which receive a plurality of the wire-form crop cover supports about said upper ends; each wire-form crop cover support comprising:

a lower wire portion including a series of wire loops in the form of a helical coil having lower and upper generally cylindrical segments, the lower segment having an internal diameter sufficiently large that it may receive the upper end of a stake, and the upper segment having an internal diameter sufficiently small that it cannot be disposed about the stake, the stake supporting the lowermost turn of the upper segment when the support is mounted on a stake, the upper segment of the helical coil having three turns;

an intermediate wire portion including a substantially vertically extending flexible wire segment and a lower end segment, the lower end segment of the intermediate wire portion being welded to the upper two turns of the upper helical segment, the lowermost turn of the upper helical segment providing increased flexibility to the intermediate wire portion; and a top wire portion having a wire end, the top wire portion being shaped in such a manner that the wire end of the top portion will not damage the crop cover, the top wire portion including a horizontally disposed circular segment, the wire end of the wire lying below the circular segment.

16. A wire-form crop cover support for supporting a crop cover which is used to cover crops in a field, there being a plurality of stakes having upper ends in the field which receive a plurality of the wire-form crop cover supports about said upper ends; each wire-form crop cover support comprising:

a lower vertically extending cylindrical helical coil wire portion having a series of wire loops, the lower end segment of the coil having an internal diameter sufficiently large to receive the upper end of a stake, and the upper segment having an internal diameter sufficiently small so that it cannot receive the upper end of the stake, the stake supporting the lowermost turn of the upper segment;

an intermediate wire portion having an upwardly extending flexible wire segment in the form of a frusto-conical coil, the lower part of the frusto-conical segment being of a smaller diameter than the upper part of the frusto-conical segment; and a top wire portion having a wire end, the top wire portion being shaped in such a manner that the wire end will not damage the crop cover, the top wire portion including a horizontally disposed circular segment, the wire end lying below the circular segment.

* * * * *